(12) United States Patent
Hirschbichler et al.

(10) Patent No.: US 11,821,600 B2
(45) Date of Patent: Nov. 21, 2023

(54) LIGHTING DEVICE FOR A HEADLIGHT

(71) Applicant: KTM AG, Mattighofen (AT)

(72) Inventors: Daniel Hirschbichler, Unken (AT); Zbyněk Kremzer, Lochen am See (AT)

(73) Assignee: KTM AG, Mattighofen (AT)

( * ) Notice: Subject to any disclaimer, the term of this patent is extended or adjusted under 35 U.S.C. 154(b) by 0 days.

(21) Appl. No.: 17/854,934

(22) Filed: Jun. 30, 2022

(65) Prior Publication Data

US 2023/0003354 A1 Jan. 5, 2023

(30) Foreign Application Priority Data

Jul. 1, 2021 (AT) ............... A 50548/2021

(51) Int. Cl.
*F21S 41/143* (2018.01)
*F21S 41/33* (2018.01)
*F21S 45/48* (2018.01)
*F21W 107/17* (2018.01)

(52) U.S. Cl.
CPC ........... *F21S 41/143* (2018.01); *F21S 41/338* (2018.01); *F21S 45/48* (2018.01); *F21W 2107/17* (2018.01)

(58) Field of Classification Search
CPC .. F21S 4/143; F21S 4/148; F21S 45/48; F21S 41/143; F21S 41/338
See application file for complete search history.

(56) References Cited

U.S. PATENT DOCUMENTS

| | | | |
|---|---|---|---|
| 7,413,326 B2* | 8/2008 | Tain | H05B 45/00 362/373 |
| 7,824,076 B2 | 11/2010 | Koester | |
| 9,310,057 B2* | 4/2016 | Helbig | F21S 41/148 |
| 9,470,391 B2 | 10/2016 | Itagaki | |
| 10,557,609 B2* | 2/2020 | Wang | F21S 41/25 |
| 10,995,926 B2 | 5/2021 | Lambri et al. | |
| 2007/0080645 A1* | 4/2007 | Smith | F21S 43/14 315/83 |
| 2009/0002997 A1 | 1/2009 | Koester | |
| 2013/0265793 A1 | 10/2013 | Helbig et al. | |
| 2014/0328079 A1 | 11/2014 | Itagaki | |
| 2016/0363268 A1 | 12/2016 | Kim | |

(Continued)

FOREIGN PATENT DOCUMENTS

| | | |
|---|---|---|
| DE | 20 2005 007 501 | 9/2005 |
| DE | 10 2008 013 604 | 9/2009 |
| DE | 10 2008 025 748 | 12/2009 |

(Continued)

*Primary Examiner* — Matthew J. Peerce
(74) *Attorney, Agent, or Firm* — Wenderoth, Lind & Ponack, L.L.P.

(57) ABSTRACT

A lighting device for a headlight includes a light-emitting element carrier having a longitudinal direction. At least one low-light-emitting element, at least one high-light-emitting element, and at least one position light-emitting element are arranged at the light-emitting element carrier. The at least one position light-emitting element is arranged, in respect of the longitudinal direction, in a front facing end zone of the light-emitting element carrier, and the at least one low-light-emitting element and the at least one high-light-emitting element in respect of the longitudinal direction are arranged behind the at least one position light-emitting element.

26 Claims, 4 Drawing Sheets

(56) References Cited

U.S. PATENT DOCUMENTS

2018/0356061 A1  12/2018  Wang et al.
2020/0355339 A1  11/2020  Lambri et al.

FOREIGN PATENT DOCUMENTS

| | | | |
|---|---|---|---|
| DE | 10 2010 044 062 | 5/2012 | |
| DE | 10 2010 063 713 | 6/2012 | |
| EP | 2 921 348 | 9/2015 | |
| EP | 2921348 A1 * | 9/2015 | ........... B60Q 1/0041 |
| JP | 2010-009529 | 1/2010 | |
| JP | 2016-021284 | 2/2016 | |
| JP | 2017-79116 | 4/2017 | |
| JP | 2019-003938 | 1/2019 | |
| TW | 539600 | 4/2017 | |
| WO | 2013/071972 | 5/2013 | |
| WO | 2014/148805 | 9/2014 | |
| WO | 2019/087142 | 5/2019 | |

* cited by examiner

LIGHTING DEVICE FOR A HEADLIGHT

BACKGROUND OF THE INVENTION

The invention relates to a lighting device for a headlight (not necessarily facing forwards), in particular of a single-track vehicle, comprising a light-emitting element carrier having a longitudinal direction, wherein arranged are at least one low-light-emitting element, at least one high-light-emitting element and at least one position light-emitting element.

Furthermore, the invention relates to a headlight having a lighting device and to a single-track vehicle having such a headlight.

In addition, the invention relates to a method for manufacturing a lighting device and a method for manufacturing a headlight.

In order to meet the regulations regarding the main light and signal light function, a motor vehicle always comprises several light-emitting elements. Motor vehicles are at least required to have one low beam, one high beam, and one position light.

The present invention relates to a headlight for single-track vehicles, wherein the headlights can also be used for other vehicles.

Regarding generic headlights, especially for the position light a separate incandescent light or a separate semi-conductor-light-emitting element is used.

This results in a higher number of components and a lower mechanical stability and density of the headlight which is particularly important when being used in off-road motorcycles. Furthermore, by having several light-emitting elements, replacing a defective light-emitting element is made more difficult.

From the prior art there are also known lighting devices that combine main light and signal light function in one lighting device. DE 10 2010 063 713 A1 discloses a lighting device having light-emitting elements which are arranged on a support element. At least one high-light-emitting element and at least one low-light-emitting element are arranged on a light-emitting carrier while at least one position light-emitting element is arranged on a heat sink from which the light-emitting carrier is protruding.

A disadvantage of this prior art is that the at least one position light-emitting element is arranged within the area of the reflector, either as stripes in the reflector or as several spot-light sources.

For arranging the at least one position light-emitting element it is therefore necessary to have a specially adapted reflector having, for example, a gap or a recess.

By arranging the at least one position light-emitting element within the area of the reflector, the distribution of light can only be adapted to a limited extent.

SUMMARY OF THE INVENTION

The objective of this invention is to create a modular lighting device having a light distribution that can be adapted and/or a headlight having such a lighting device.

According to the invention, the at least one position light-emitting element is arranged, in respect of the longitudinal direction, in a front facing end zone of the light-emitting element carrier and the at least one low-light-emitting element and the at least one high-light-emitting element in respect of the longitudinal direction are arranged behind the at least one position light-emitting element.

Because the at least one position light-emitting element is arranged, in respect of the longitudinal direction, in a front facing end zone of the light-emitting element carrier, the at least on one position light-emitting element, in a state of being mounted in a headlight, can be arranged at a distance from the reflector. Light emitted by the at least one position light-emitting element can exit directly or by way of the reflector from the headlight. Dependent on the dimensions of the light-emitting element carrier and the configuration of the at least one position light-emitting element, the light distribution can therefore be flexibly adapted by the positioning in the end zone of the light-emitting element carrier.

Because the at least one low-light-emitting element and the at least one high-light-emitting element are arranged behind the at least one position light-emitting element in respect of the longitudinal direction, it is possible that the light-emitting elements each produce differing light distribution.

In a preferred embodiment, in the endzone there is arranged a transmitting optic element around the at least one position light-emitting element. The light distribution of the at least one position light-emitting element can be influenced by the transmitting optic element. In particular, a spatially more extended light distribution can be created by that. This way, light can be deflected into a reflector despite the position of the at least one position light-emitting element in the end zone of the light-emitting element carrier.

Preferably, the transmitting optic element is in the form of a diffuser and/or has a vertical ribbing and/or cylindrical lenses that are lined up.

In a further embodiment, a reflecting optic element is arranged around the at least one position light-emitting element in the end zone in such way that the light distribution of the at least one position light-emitting element can be influenced by the reflecting optic element.

Furthermore, the reflecting optic element can be arranged in such a way that the at least one position light-emitting element is shielded from the at least one low-light-emitting element and the at least high-light-emitting element. This way, the light distribution of the light-emitting elements can be adapted independently from each other.

In particular, the reflecting optic element can have a preferably concave outline and/or in respect of the longitudinal direction can be arranged behind the at least one position light-emitting element. This way, light of the at least one position element which is radiated to the back can be reflected to the front by the reflector. Therefore, the light efficiency can be increased by which less energy is used, and less heat is produced.

Light reflected from the reflecting optic element can beam through the transmitting optic element in the further course of the rays. The light distribution of the position light can therefore be determined by the choice of the transmitting and the reflecting optic element in combination with the arrangement in the reflector of the headlight.

Preferably, the reflecting optic element is made of a heat-conducting material, wherein the heat-conducting material can dissipate heat from at least one position light-emitting element to a heat sink.

At least two position light-emitting elements can be provided which are arranged on two opposite sides of the light-emitting element carrier. This way, a symmetric light distribution can be created, in particular, the top and bottom of the reflector can be radiated.

The at least one low-light-emitting element and the at least one high-light-emitting element can be arranged on two opposite sides of the light-emitting element carrier. This way, the two light-emitting elements are shielded from each other. The at least one low-light-emitting element is preferably arranged on a top side so that light is emitted to the top and by the reflector reflected to the front and to the bottom. The at least one high-light-emitting element is preferably arranged on a bottom side so that light is emitted to the bottom and by the reflector reflected to the front and partially to the top.

In addition, the at least one low-light-emitting element and the at least one high-light-emitting element can be arranged in the longitudinal direction offset to one another. As this way the light-emitting elements each have their own longitudinal section of the light-emitting element carrier, heat can be dissipated more easily. Furthermore, less heat is emitted from at least one low-light-emitting element to the at least one high-light-emitting element, or vice versa, than with light-emitting elements that are arranged directly opposite to each other.

In one embodiment, the lighting device has a heat sink, wherein the light-emitting element carrier is arranged at the heat sink in such way that, in respect of the longitudinal direction, the front facing end zone of the light-emitting element carrier is facing away from the heat sink. This way a lighting device is created that has a heat sink on the one end and at least one position light-emitting element on the other end.

The heat sink can have cooling ribs so that heat can be emitted to the environment more easily. Furthermore, in the heat sink there can be arranged a control device that is cooled by the heat sink. The control device is provided for controlling the light-emitting elements.

A heat-conducting member can be arranged at the light-emitting element carrier, wherein the heat-conducting member is connected with the heat sink in such way that heat can be conducted from the light-emitting element carrier into the heat sink. This is for cooling of the light-emitting elements. Especially, the at least one low-light-emitting element and/or the at least one high-light-emitting element produce a lot of heat and should therefore be cooled.

In this case, the heat-conducting member can be connected in one piece with the heat sink. This way an especially good heat conduction from the heat-conducting member to the heat sink is guaranteed. Furthermore, the lighting device is constructed more stable this way. The heat-conducting member and/or the heat sink are preferably made of aluminum.

"Connected in one piece" can mean "integrally" connected or "made of a consistent component".

The at least one low-light-emitting element and/or the at least one high-light-emitting element and/or the at least one position light-emitting element can be arranged in a recess of the heat-conducting member. They are particularly preferably covered and/or enclosed by the heat-conducting member. This way, heat can be dissipated very efficiently from the light-emitting elements. Furthermore, the light-emitting elements can be arranged in the inside of the heat-conducting member, for example on a circuit board, and protrude to the outside through the recesses.

If the at least one low-light-emitting element and/or the at least high-light-emitting element are arranged in the longitudinal direction offset to one another, the area opposite of each respective light-emitting element is filled by the heat-conducting member and in particular free of a light-emitting element. The area opposite of each respective light-emitting element can therefore dissipate heat. Because of the offset arrangement, heat can be dissipated more easily by the light-emitting elements.

In the area of the at least one low-light-emitting element and/or the at least one high-light-emitting element, the heat-conducting member has a narrowing so that the surface of the light-emitting elements substantially runs even with the surface of the heat-conducting member. This way, light-emitting elements that are arranged in the inside of the heat-conducting member, for example on a circuit board, do not need to project that much to the outside. Therefore, the recesses can be configured in a shorter manner.

Furthermore, the heat-conducting member in the end zone can have a preferably concave outline which serves as a reflecting optic element for the at least one position light-emitting element. This way, the light efficiency of the at least one position light-emitting element can be increased on the one hand and on the other hand heat can be dissipated from the at least one position light-emitting element. Because of the higher light efficiency, less heat is produced from the beginning.

In one embodiment, the lighting device can have a circuit board, wherein the at least one low-light-emitting element and/or the at least one high-light-emitting element and/or the at least one position light-emitting element are arranged on the circuit board. This way, a complicated and error-prone wiring of the light-emitting elements becomes obsolete.

The circuit board can project from the heat sink into the light-emitting element carrier. In particular, the circuit board can extend through the entire light-emitting element carrier in the longitudinal direction. This way, a control device arranged in the heat sink as well as the light-emitting elements arranged at the light-emitting element carrier can be electrically connected without wiring.

Between the circuit board and the heat sink and/or between the circuit board and the heat-conducting member, heat-conducting paste and/or a heat-conducting pad, preferably having a thickness of 0.8 millimeters, can be arranged. This way, heat can be transferred more efficiently form the circuit board to the heat sink and/or the heat-conducting member.

In one particularly preferred embodiment, a first heat-conducting component comprises an upper part of the heat sink and an upper part of the heat-conducting member, and a second heat-conducting component comprises a lower part of the heat sink and a lower part of the heat-conducting member. This way, on the one hand a good transport of heat from the heat-conducting member with the light-emitting elements to the heat sink can be achieved. On the other hand, because of the two-part construction, an interior of the heat sink and/or the heat-conducting member becomes accessible. This way, it is possible to have a simple assembly of the lighting device.

The circuit board can be arranged between the first heat-conducting component and the second heat-conducting component.

The first heat-conducting component and the second heat-conducting component can be attached to each other by means of at least one fixing means, in particular a screw.

The at least one low-light-emitting element is arranged in a first recess of the first heat-conducting component and the at least one high-light-emitting element is arranged in a second recess of the second heat-conducting component. Then, in particular, the first heat-conducting component is arranged on the top and the second heat-conducting component is arranged on the bottom.

In one embodiment, the at least one low-light-emitting element, the at least one high-light-emitting element and/or the at least one position light-emitting element are in the form of semi-conductor light sources, in particular light-emitting diodes or laser diodes.

Preferably, the light-emitting elements emit white light during operation.

A headlight according to the invention comprises a lighting device according to the present disclosure and has at least one, preferably concave, reflector. During operation, light of the at least one low-light-emitting element and/or of the at least high-light-emitting element and/or of the at least one position light-emitting element is reflected at the reflector.

As already described above, the light distribution can be influenced by the positioning of the light-emitting elements in the reflector. A special advantage here is the positioning according to the invention of the at least one position light-emitting element in the end zone of the light-emitting element carrier, and therefore in an interior generated by the reflector.

The reflector can have a passage, wherein the light-emitting element carrier projects though the passage in the state of being mounted. The light-emitting element carrier can be arranged in an interior generated by the reflector and/or the heat sink can be arranged outside of an interior generated by the reflector. This way, the light-emitting element carrier projects into the interior generated by the reflector, wherein the at least one position light-emitting element projects the most to the front.

Preferably, the at least one low-light-emitting element is arranged at a first, in particular at a top, side of the light-emitting element carrier so that its light can be reflected exclusively form a first, in particular top, half of the reflector.

The at least one high-light-emitting element can be arranged at a second, in particular at a bottom, side of the light-emitting element carrier so that its light can be reflected exclusively from a second, in particular bottom, half of the reflector.

The at least one position light-emitting element can be arranged at a first, in particular at a top, side, and at a second, in particular at a bottom, side of the light-emitting element carrier so that its light can be reflected from a first, in particular top, half of the reflector and from a second, in particular bottom, half of the reflector.

Differing, in particular not overlapping, reflector areas are provided, wherein one area each is used for one light function. This way, the light distribution can be individually adapted to each light function.

The at least one low-light-emitting element can be reflected, in particular exclusively, from a reflector area for the low beam. The at least one high-light-emitting element can be reflected, in particular exclusively, from a reflector area for the high beam. The at least one position light-emitting element can be reflected, in particular exclusively, from a reflector area for the position light.

A one-track vehicle according to the invention, in particular a motorcycle, has a headlight according to the disclosure of the present application.

In this case, the headlight can preferably be used as a front headlight. This way the longitudinal direction of the light-emitting element carrier points essentially into the forward direction of driving of the one-track vehicle. This way, the at least one position light-emitting element is arranged in the front in forward direction of driving.

A method according to the invention for manufacturing a lighting device has the following steps:
the first heat-conducting component is arranged at a first side of the circuit board,
the second heat-conducting component is arranged at a second side opposite of the first side of the circuit board,
the first heat-conducting component is attached to the second heat-conducting component, preferably by means of a fixing means, wherein the circuit board is held between the two heat-conducting components.

This way, a lighting device can be simply manufactured having the described, advantageous features. Furthermore, the lighting device can be easily disassembled for maintenance purposes or for error analysis in order to get, for example, access to the circuit board with the control device and the light-emitting elements.

When using a method according to the invention for manufacturing a headlight, the light-emitting element carrier is led through a passage in the reflector and attached at a fixing interface at the reflector.

In this case, the fixing interface is suitable for further lamps, especially halogen lamps. The further lamps can correspond to standard versions available in stores. This way, an older headlight can be refitted with the lighting device. This refitting is often known as "retrofit".

BRIEF DESCRIPTION OF THE DRAWINGS

Further preferred embodiments and details are shown in the Figures.

DETAILED DESCRIPTION OF THE INVENTION

Figure 1A:
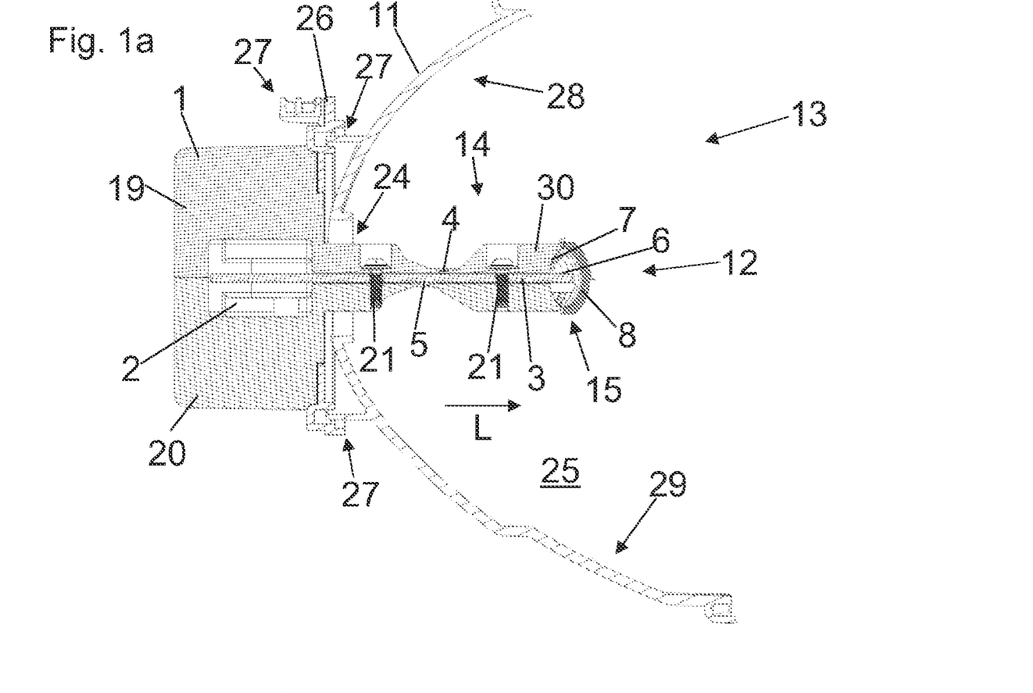
FIG. 1a shows a headlight with a lighting device in a lateral sectional view
Figure 1B:
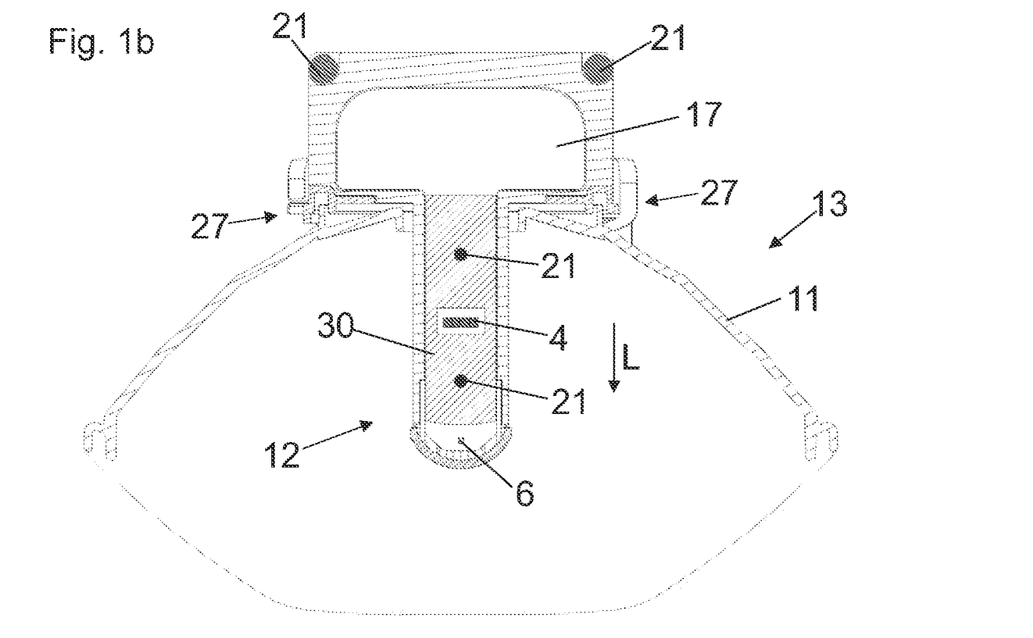
FIG. 1b shows a headlight with a lighting device is a sectional view from the top

The FIGS. 1a and 1b show sectional views of a headlight 13 with a lighting device 12.

Such a headlight 13 can for example be used for a one-track vehicle, in particular a motorcycle. In particular, such a headlight 13 can be used as front headlight.

The headlight 13 has a concave reflector 11, wherein, during operation, light of the at least one low-light-emitting element 4 and/or the at least one high-light-emitting element 5 and/or the at least one position light-emitting element 6 is reflected at the reflector 11.

The at least one low-light-emitting element 4, the at least one high-light-emitting element 5 and/or the at least one position light-emitting element 6 are in the form of semi-conductor light sources, in particular light-emitting diodes or laser diodes. It is provided that they emit white light during operation.

Figure 2:
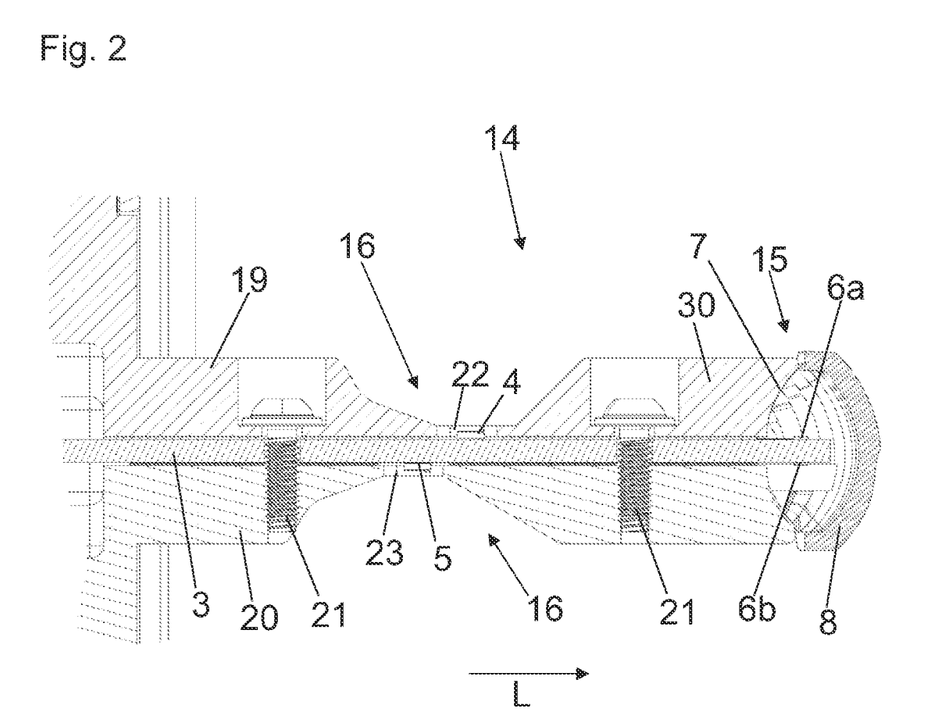
FIG. 2 shows light-emitting element carriers in a sectional view from the side

FIG. 2 shows a detailed view of the view in FIG. 1a, wherein the lighting device 12, in particular the light-emitting element carrier 14 of the lighting device 12, is shown in detail.

Details regarding the headlight 13, the lighting device 12 and the light-emitting element carrier 14 are explained in the following by means of the FIGS. 1a, 1b and 2.

The light-emitting element carrier 14 has a longitudinal direction L. In particular, the light-emitting element carrier can be designed columnar or rod-like.

At least one low-light-emitting element 4, at least one high-light-emitting element 5 and least one position light-emitting element 6 are arranged at the light-emitting element carrier 14. The at least one position light-emitting element 6 is arranged, in respect of the longitudinal direction L, in a front facing end zone 15 of the light-emitting element carrier 14. In addition, the at least one low-light-emitting element 4 and the at least one high-light-emitting element 5 are arranged, in respect of the longitudinal direction L, behind the at least one position light-emitting element 6.

The at least one low-light-emitting element 4 is arranged at a first, in particular at a top, side of the light-emitting element carrier 14 so that its light is reflected exclusively from a first, in particular a top, half of the reflector 28.

The at least one high-light-emitting element 5 is arranged at a second, in particular at a bottom, side of the light-emitting element carrier 14 so that its light is reflected exclusively from a second, in particular a bottom, half of the reflector 29.

The at least one position light-emitting element 6 is arranged at a first, in particular at a top, side and at a second, in particular at a bottom, side of the light-emitting element carrier 14 so that its light can be reflected from a first, in particular a top, half of the reflector 28 and/or from a second, in particular a bottom, half of the reflector 29.

The reflector 11 can have several facets in its top half of the reflector 28 and/or its bottom half of the reflector 29, by which the light distribution can be influenced.

The top half of the reflector 28 can have a form and/or size differing from the form and/or size of the bottom half of the reflector 29, as shown in FIG. 1a.

The at least one low-light-emitting element 4 and the at least one high-light-emitting element 5 are arranged on two opposite sides of the light-emitting element carrier 14. Furthermore, the at least one low-light-emitting element 4 and the at least one high-light-emitting element 5 arranged in the longitudinal direction L offset to one another. This way, a part of the heat-conducting member 30, which is described in further detail further below, is also arranged in an area opposite of each respective light-emitting element 4, 5, by which heat can be dissipated more easily.

At least two position light-emitting elements 6a, 6b are provided that are arranged on two opposite sides of the light-emitting element carrier 14.

In the end zone 15, a transmitting optic element 8 is arranged around the at least one position light-emitting element 6, wherein the light distribution of the at least one position light-emitting element 6 can be influenced by the transmitting optic element 8. This way, the light distribution can be expanded in such way that more light is scattered onto the reflector 11.

The transmitting optic element 8 is in the form of a diffuser and/or has a vertical ribbing and/or cylindrical lenses that are lined up.

In the end zone 15, there is further a reflecting optic element 7 arranged around the at least one position light-emitting element 6 so that the light distribution of the at least one position light-emitting element 6 can be influenced by the reflecting optic element 7 and so that the at least one position light-emitting element 6 is shielded from the at least one low-light-emitting element 4 and the at least one high-light-emitting element 5.

The reflecting optic element 7 has a, preferably concave, outline and, in respect of the longitudinal direction L, is arranged behind the at least one position light-emitting element 6. This way the light efficiency can be increased in the forward direction.

Furthermore, the reflecting optic element 7 is made of a heat-conducting material, in particular, the reflecting optic element 7 is a part of the heat-conducting member 30, which is described further below. This way, heat can be dissipated.

The lighting device 12 has a heat sink 1, wherein the light-emitting element carrier 14 is arranged at the heat sink 1 in such way that, in respect of the longitudinal direction L, the front facing end zone 15 of the light-emitting element carrier 14 is facing away from the heat sink 1.

A heat-conducting member 30 is arranged at the light-emitting element carrier 14, wherein the heat-conducting member 30 is connected with the heat sink 1 in such way that heat can be conducted from the light-emitting element carrier 14 to the heat sink 1. The heat can be emitted to the environment from the heat sink 1.

The heat-conducting member 30 is connected with the heat sink 1 in one piece. In particular, the heat-conducting member 30 and the heat sink 1 are in the form of two consistent aluminum components.

The at least one low-light-emitting element 4 and the at least one high-light-emitting element 5 and/or the at least one position light-emitting element 6 is/are each arranged in a recess 22, 23 of the heat-conducting member 30 and is/are covered and/or enclosed by the heat-conducting member 30.

The heat-conducting member 30 has a narrowing in the area of the at least one low-light-emitting element 4 and the at least one high-light-emitting element 5 so that the surface of the light-emitting elements 4, 5 run essentially even with the surface of the heat-conducting member 30.

The heat-conducting member 30, in the end zone 15, has a, preferably concave, outline which serves as reflecting optic element 7 for the at least one position light-emitting element 6.

The lighting device 12 has a circuit board 3, wherein the at least one low-light-emitting element 4 and/or the at least one high-light-emitting element 5 and/or the at least one position light-emitting element 6 are arranged on the circuit board 3.

The circuit board 3 projects from the heat sink 1 in the light-emitting element carrier 14, in particular, the circuit board 3 extends through the entire light-emitting element 14 in the longitudinal direction L.

FIG. 2 shows that the circuit board 3 extends beyond the heat-conducting member 30 and its end which is formed as reflecting optic element 7. In this area, the position light-emitting elements 6a, 6b are arranged on opposite sides.

At the circuit board 3, there is arranged a control device 2. In addition, the control device 2 is arranged in a recess 17 of the heat sink 1. This way, all electronic elements are arranged on one circuit board 3, by which a wiring is no longer necessary.

A first heat-conducting component 19 comprises a top part of the heat sink 1 and a top part of the heat-conducting member 30 and a second heat-conducting component 20 comprises a bottom part of the heat sink 1 and a bottom part of the heat-conducting member 30. The circuit board 3 is arranged between the first heat-conducting component 19 and the second heat-conducting component 20. The first heat-conducting component 19 and the second heat-conducting component 20 are attached to each other by means of at least one fixing means 21, in particular a screw. The at least one low-light-emitting element 4 is arranged in a first recess 22 of the first heat-conducting component 19. The at least one high-light-emitting element 5 is arranged in a second recess 23 of the second heat-conducting component 20.

A method for manufacturing a lighting device 12 as shown in the FIGS. 1*a*, 1*b* and 2 can have the following method steps:

- the first heat-conducting component 19 is arranged at a first side of the circuit board 3,
- the second heat-conducting component 20 is arranged at a second side opposite of the first side of the circuit board 3,
- the first heat-conducting component 19 is attached to the second heat-conducting component 20, preferably by means of a fixing means 21, wherein the circuit board 3 is held between the two heat-conducting components 19, 20.

The reflector 11 has a passage 24, wherein the light-emitting element carrier 14 projects though the passage 24 in the state of being mounted, and/or the light-emitting element carrier 14 is arranged in an interior 25 generated by the reflector 11 and the heat sink 1 is arranged outside of an interior 25 generated by the reflector 11.

A method for manufacturing a headlight 13 as shown in the FIGS. 1*a*, 1*b* and 2 can provide that the light-emitting element carrier 14 is led through a passage 24 in the reflector 11 and is attached at the reflector 11 at a fixing interface 27. The fixing interface 27 can also be suitable for further lamps, especially halogen lamps. This way, the lighting device 12 can also be used in already used headlights 13.

The FIGS. 3*a*, 3*b*, 4*a* and 4*b* show different views of a lighting device 12, which essentially is executed the same way as in the FIGS. 1*a*, 1*b* and 2.

Beyond the versions of the FIGS. 1*a*, 1*b* and 2, the FIGS. 3*a*, 3*b*, 4*a* and 4*b* show the following aspects well:

The heat sink 1 has cooling ribs 18 so that heat can be dissipated faster to the environment.

Figure 3A:
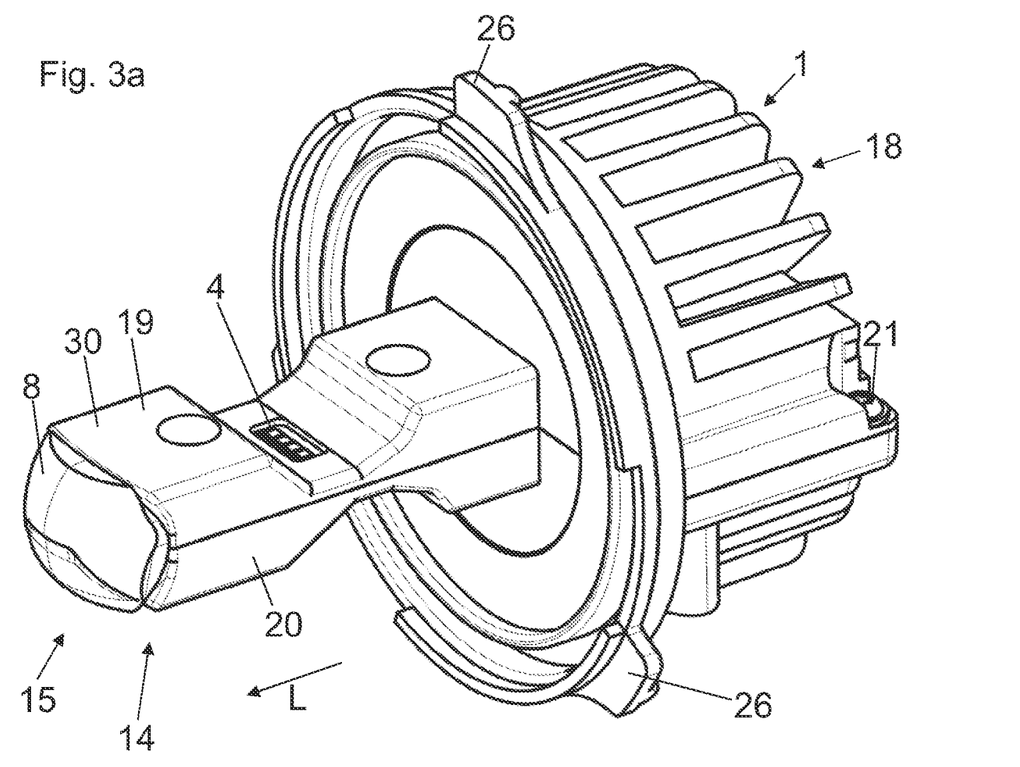
FIG. 3a shows a lighting device in a perspective view
Figure 3B:
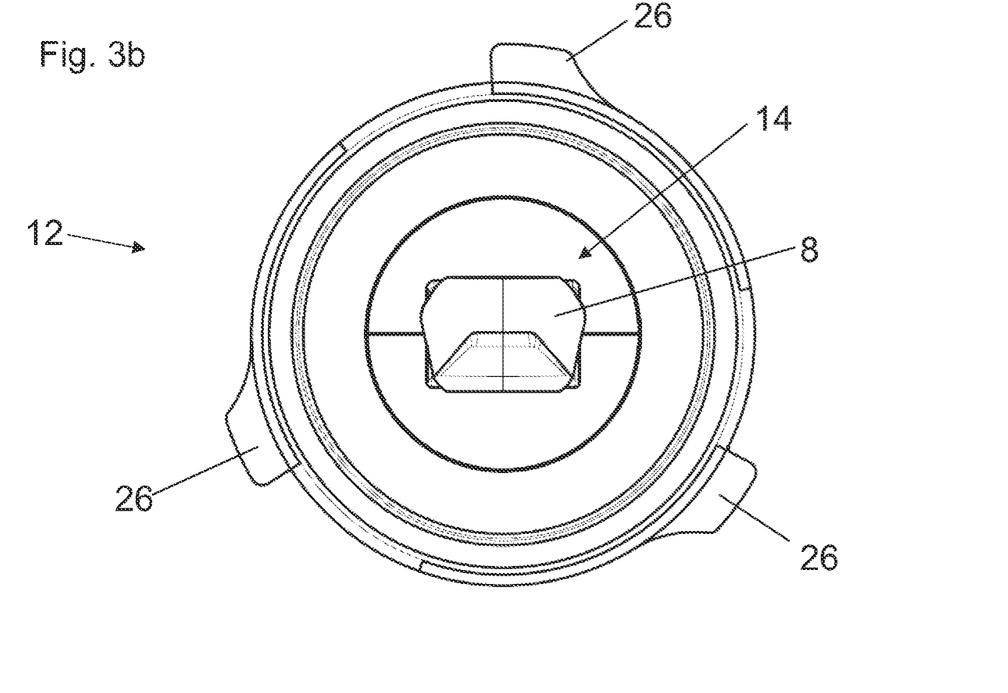
FIG. 3b shows a lighting device in a front view
Figure 4A:
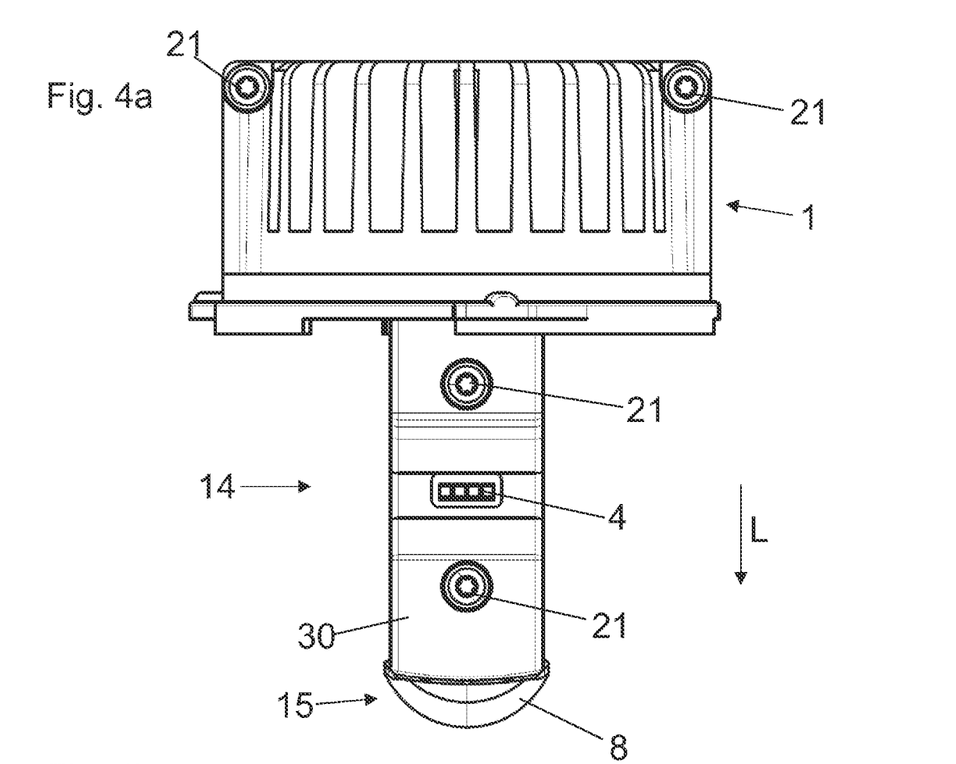
FIG. 4a shows a lighting device in a plan view
Figure 4B:
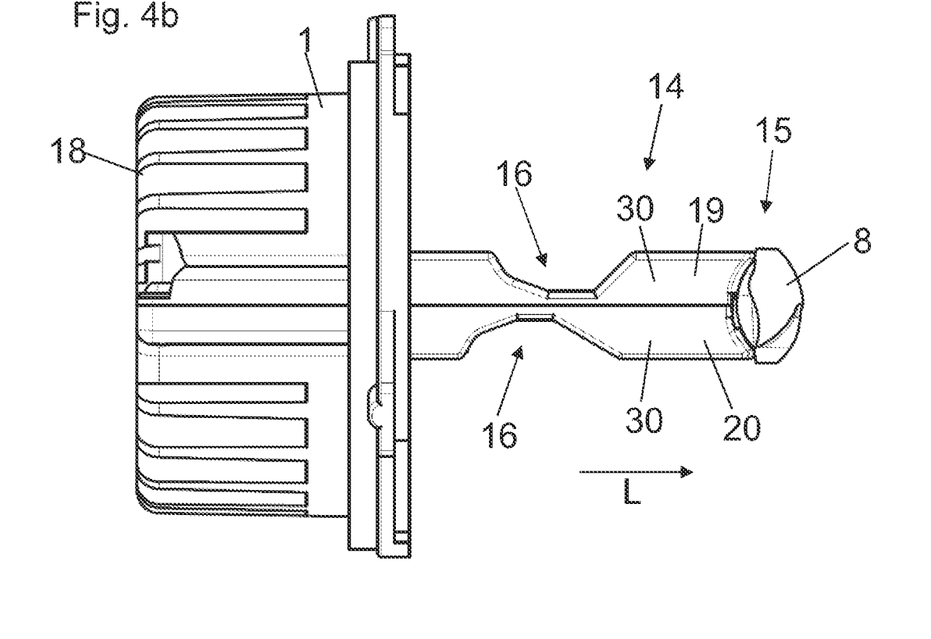
FIG. 4b shows a lighting device in a lateral view

Also, FIGS. 3*a* and 4*a* show fixing means 21 for attaching the first heat-conducting component 19 to the second heat-conducting component 20 in the area of the heat sink 1.

FIG. 4*a* shows that four low-light-emitting elements 4 arranged next to each other are provided. The desired luminous flux can be chosen by the number of light-emitting elements.

The heat sink 1 is of a round shape and has fixing elements 26 on the edges as counterparts to the fixing interface 27 at the headlight 13.

LIST OF REFERENCES 1 heat sink
2 control device
3 circuit board
4 low-light-emitting element
5 high-light-emitting element
6 position light-emitting element
6*a* top position light-emitting element
6*b* bottom position light-emitting element
7 reflecting optic element
8 transmitting optic element
9 light beam
10 light beam
11 reflector
12 lighting device
13 headlight
14 light-emitting element carrier
15 end zone of the light-emitting element carrier
16 narrowing 3
17 recess in the heat sink
18 cooling ribs
19 first component of the heat sink
20 second component of the heat sink
21 fixing means
22 first recess
23 second recess
24 passage of the reflector
25 interior of the reflector
26 fixing elements
27 fixing interface
28 first half of the reflector
29 second half of the reflector
30 heat-conducting member

The invention claimed is:

1. A lighting device for a headlight, comprising:
   a light-emitting element carrier having a longitudinal direction;
   at least one low-beam-emitting element and at least one high-beam-emitting element arranged at the light-emitting element carrier; and
   at least one two position light-emitting elements arranged at the light-emitting element carrier,
   wherein the at least one two position light-emitting elements are arranged in a front facing end zone of the light-emitting element carrier with respect to the longitudinal direction, and that the at least one low-beam-emitting element and the at least one high-beam-emitting element in respect of the longitudinal direction are arranged behind the at least two position light-emitting elements with respect to the longitudinal direction,
   wherein the at least two position light-emitting elements are respectively arranged on opposite surfaces of the light-emitting element carrier; and
   wherein a reflecting optic element is arranged in the front facing end zone and at the at least two position light-emitting elements such that light distributions of the at least two position light-emitting elements can be influenced by the reflecting optic element, and such that the at least two light-emitting elements are shielded from the at least one low-beam-light-emitting element and the at least one high-beam-emitting element.

2. The lighting device according to claim 1, wherein a transmitting optic element is arranged in the front facing end zone and around the at least two position light-emitting elements, wherein light distributions of the at least two position light-emitting elements can be influenced by the transmitting optic element.

3. The lighting device according to claim 1, wherein
   the at least one low-beam-emitting element and the at least one high-beam-emitting element are arranged on two opposite sides of the light-emitting element carrier or are arranged offset from one another with respect to the longitudinal direction.

4. The lighting device according to claim 1, further comprising a heat sink, wherein the light-emitting element carrier is arranged at the heat sink so that the front facing end zone of the light-emitting element carrier is facing away from the heat sink with respect to the longitudinal direction.

5. The lighting device according to claim 1, further comprising:
   a heat sink; and
   a heat-conducting member arranged at the light-emitting element carrier and connected with the heat sink such that heat can be conducted from the light-emitting element carrier into the heat sink.

6. The lighting device according to claim 1, further comprising:
   a heat sink; and a circuit board, wherein the at least one low-beam-emitting element or the at least one high-beam-emitting element or the at least two position light-emitting elements are arranged on the circuit board.

7. The lighting device according to claim 4, further comprising:
a heat-conducting member arranged at the light-emitting element carrier and connected with the heat sink such that heat can be conducted from the light-emitting element carrier into the heat sink; and
a circuit board,
wherein a first heat-conducting component comprises a top part of the heat sink and a top part of the heat-conducting member, and a second heat-conducting component comprises a bottom part of the heat sink and a bottom part of the heat-conducting member.

8. The lighting device according to claim 1, wherein the at least one low-beam-emitting element, the at least one high-beam-emitting element or the at least two position light-emitting elements
are in the form of semi-conductor light sources, or
radiate white light during operation.

9. A headlight comprising the lighting device according to claim 1, wherein the headlight has a reflector, wherein light of the at least one low-beam-emitting element or of the at least one high-beam-emitting element or of the at least two position light-emitting elements is reflected at the reflector during operation.

10. The headlight according to claim 9, wherein
the reflector has a passage, wherein the light-emitting element carrier projects through the passage in a state of being mounted, or
the light-emitting element carrier is arranged in an interior generated by the reflector, or
a heat sink is arranged outside of an interior generated by the reflector.

11. The headlight according to claim 9, wherein the at least one low-beam-emitting element is arranged at a first side of the light-emitting element carrier such that its light can be reflected exclusively from a first half of the reflector, or
the at least one high-beam-emitting element is arranged at a second side of the light-emitting element carrier such that its light can be reflected exclusively from a second half of the reflector, or
the at least two position light-emitting elements are respectively arranged at a first side and a second side of the light-emitting element carrier such that light therefrom can be reflected from a first half of the reflector and a second half of the reflector, respectively.

12. A one-track vehicle comprising the headlight according to claim 9.

13. A method for manufacturing the lighting device according to claim 7, the method comprising:
arranging the first heat-conducting component at a first side of the circuit board;
arranging the second heat-conducting component at a second side of the circuit board, the first and second sides being opposite sides of the circuit board; and
attaching the first heat-conducting component to the second heat-conducting component, wherein the circuit board is held between the first and second heat-conducting components.

14. A method for manufacturing the headlight according to claim 9, wherein the light-emitting element carrier is led through a passage in the reflector and is attached at a fixing interface at the reflector.

15. The lighting device according to claim 2, wherein the transmitting optic element is in the form of a diffuser, or has a vertical ribbing, or has cylindrical lenses that are lined up.

16. The lighting device according to claim 3, wherein
the reflecting optic element has a concave outline, or
the reflecting optic element is arranged behind the at least two position light-emitting elements with respect to the longitudinal direction, or
the reflecting optic element is made of a heat-conducting material.

17. The lighting device according to claim 4, wherein the heat sink has cooling ribs, or a control device is arranged in the heat sink.

18. The lighting device according to claim 5, wherein
the heat-conducting member is connected with the heat sink in one piece, or
the at least one low-beam-emitting element or the at least one high-beam-emitting element or the at least two position light-emitting elements is arranged in a recess of the heat-conducting member and is covered or enclosed by the heat-conducting member, or
the heat-conducting member has a narrowing in an area of the at least one low-beam-emitting element or the at least one high-beam-emitting element such that surfaces of the light-emitting elements essentially run even with a surface of the heat-conducting member, or
the heat-conducting member, in the front facing end zone, has a concave outline that serves as reflecting optic element for the at least two position light-emitting elements.

19. The lighting device according to claim 6,
wherein the circuit board projects from the heat sink into the light-emitting element carrier,
wherein the circuit board extends through the entire light-emitting element carrier in the longitudinal direction, or
a control device is arranged at the circuit board.

20. The lighting device according to claim 7, wherein
the circuit board is arranged between the first heat-conducting component and the second heat-conducting component, or
the first heat-conducting component and the second heat-conducting component can be attached to each other by a screw, or
the at least one low-beam-emitting element is arranged in a first recess of the first heat-conducting component and the at least one high-beam-emitting element is arranged in a second recess of the second heat-conducting component.

21. The lighting device according to claim 8, wherein the at least one low-beam-emitting element, the at least one high-beam-emitting element or the at least two position light-emitting elements are in the form of light-emitting diodes or laser diodes.

22. The headlight according to claim 9, wherein the at least one reflector is a concave reflector.

23. The headlight according to claim 11, wherein
the first side of the light-emitting element carrier is a top side of the light-emitting element carrier,
the second side of the light-emitting element carrier is a bottom side of the light-emitting element carrier,
the first half of the reflector is a top half of the reflector, and
the second half of the reflector is a bottom half of the reflector.

24. The one-track vehicle according to claim 12, wherein the one-track vehicle is a motorcycle, and wherein the headlight is used as front headlight.

25. The method according to claim 13, wherein
the first heat-conducting component is attached to the second heat-conducting component by a fixing means.

26. The method according to claim 14, wherein the fixing interface is suitable for halogen lamps.

* * * * *